3,218,370
HEAT HARDENABLE COMPOSITIONS OF TRI- OR TETRA-GLYCIDYL ETHERS AND PHENOLIC RESINS
John S. Fry, Somerville, and John L. Welch, Jr., Bound Brook, N.J., assignors to Union Carbide Corporation, a corporation of New York
No Drawing. Filed June 30, 1960, Ser. No. 39,772
19 Claims. (Cl. 260—831)

This application is a continuation-in-part of application Serial No. 738,301 filed May 28, 1958, now abandoned.

This invention relates to improved epoxide compositions. More particularly, this invention relates to compositions of polyglycidyl ethers of polyphenylols containing a phenolformaldehyde condensate which have particular utility in the production of laminated products.

Generally in the production of laminates such as asbestos or glass cloth laminates it is customary to impregnate the sheets of asbestos or glass cloth with a solution of a thermosetting resin having high bonding strength, to then stack the impregnated sheets together and to apply heat and pressure whereby the volatiles are driven off, the resin cures to an infusible product and the sheets are bonded together in a unitary mass.

Heretofore, epoxide compositions, such as compositions of diglycidyl ether of 2,2-bis(p-hydroxyphenyl)propane, although exhibiting excellent bonding strength, particularly when used to bond together asbestos or glass cloth sheets, were thermally unstable at relatively high temperatures. Laminates in which the aforementioned epoxides were used as the bonding material underwent a degradation, particularly with respect to their physical strengths on prolonged exposure to relatively high temperatures and also suffered a loss of weight due to the degradation of the bonding material.

We have now found, however, that by combining a polyglycidyl ether of a polyphenylol having three or four phenylol groups in its molecule and having an epoxy equivalency or an epoxy functionality of at least three, that is, having at least three epoxy groups

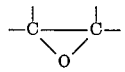

per molecule with a stoichiometric amount of a phenol-formaldehyde condensate having a phenolic hydroxyl functionality of at least three, i.e., having an average of at least three reactive phenolic hydroxyl groups per molecule, such that the total functionality of the composition is at least three, that a composition is produced which, when cured, is thermally stable at temperatures as high as 500° F., and has excellent bonding strength, especially when used to laminate materials such as asbestos and glass cloth sheets.

Laminates in which the compositions of my invention are used as the bonding material are characterized by excellent thermal stability as evidenced by a high retention of their physical properties, such as tensile strength and flexural modulus, on prolonged exposure to temperatures as high as 500° F. Furthermore, the compositions of this invention have excellent pot lives and can be used under normal working conditions as they do not cure to an infusible, unworkable state immediately upon formulation, but merely increase slightly in viscosity at room temperature during a period of up to about 60 days.

Total functionality of the composition can be calculated by use of the equation:

$$f(t) = \frac{Nafa + Nbfb}{Na + Nb}$$

wherein:

$Na$=number of moles of the polyglycidyl ether
$fa$=epoxy functionality of the polyglycidyl ether
$Nb$=number of moles of the phenol-formaldehyde condensate
$fb$=phenolic hydrovyl functionality of the phenol-formaldehyde condensate Suitable polyglycidyl ethers of polyphenylols include the glycidyl ethers of 1,1,3-tris(p-hydroxyphenyl)propane,
1,1,2,2-tetrakis(hydroxyphenyl)ethane,
1,1,3,3-tetrakis(hydroxyphenyl)propane,
1,1,4,4-tetrakis(hydroxyphenyl)butane,
1,1,5,5-tetrakis(hydroxyphenyl)-3-methyl pentane,
1,1,4,4-tetrakis(hydroxyphenyl)-2-ethyl butane,
1,1,8,8-tetrakis(hydroxyphenyl)octane,
1,1,10,10-tetrakis(hydroxyphenyl)decane, and the like, as well as corresponding compounds containing substituent groups in the aliphatic chain which connects the phenol groups, such as 1,1,3,3-tetrakis(hydroxyphenyl)-2-chloropropane,
1,1,4,4-tetrakis(hydroxyphenyl)-2,3-dibromobutane,
1,1,6,6-tetrakis(hydroxyphenyl)pentanol-2,
1,1,5,5-tetrakis(hydroxyphenyl)hexanol-2.

Also suitable are the polyphenols having substituted hydroxyphenyl groups, such as 1,1,3-tris(3,5-dimethyl-4-hydroxyphenyl)propane,
1,1,2-tris(3,5-dimethyl-4-hydroxyphenyl)propane,
1,1,2,2-tetrakis(2-hydroxy-5-methylphenyl)ethane,
1,1,3,3-tetrakis(4-hydroxy-2,6-ditertiary butyl phenyl) propane,
1,1,6,6-tetrakis(3-chloro-4-hydroxyphenyl)hexane, and other like compounds wherein the phenylol groups in the molecule are linked together by a common aliphatic hydrocarbon chain, preferably having a maximum of six carbon atoms. Particularly desirable for purposes of this invention is the triglycidyl ether of a 1,1,3-tris(hydroxyphenyl)propane described in U.S. 2,885,385 to A. G. Farnham, which is incorporated herein by reference. Polyglycidyl ethers of polyphenylols can be conveniently produced by the process described subsequently in this specification and also according to the process described in U.S. 2,806,016 which is incorporated herein by reference.

The phenol-formaldehyde condensates which are combined with the polyglycidyl ethers of the polyphenylols according to the present invention are products formed by the reaction of phenols and formaldehyde to form condensation products containing reactive phenolic hydroxyl groups. The phenol-formaldehyde condensates have their condensation carried to a stage where the condensate is still soluble in organic solvents, fusible, and still capable of further reaction through their reactive phenolic hydroxyl groups.

The condensation of phenols and formaldehyde can be carried out in the presence of either an acid or base condensing agent and in some cases by first combining the formaldehyde with a base such as ammonia to form hexamethylenetetramine and reacting the hexamethylenetetramine with the phenol to form the phenol-formaldehyde condensate.

The phenol-formaldehyde condensates can be derived from monohydric phenols or polyhydric phenols, illustrative of which are the cresols, xylenols, and resorcinol. The phenol-formaldehyde condensates can be water soluble, alcohol soluble, or oil soluble.

The phenol-formaldehyde condensates can be heat hardenable types, i.e., resole resins, or they can be permanently fusible types, i.e., novolak resins. The resoles self-condense through their methylol groups and react with the epoxy groups of the polyglycidyl ethers of the polyphenylols through their phenolic hydroxyl groups. The novolaks react directly with the polyglycidyl ethers of the polyphenylols through their phenolic hydroxyl groups.

The novolak resins are generally prepared by reacting a mixture containing less than one mole of formaldehyde per each mole of phenol in the presence of an acid catalyst. Novolaks, also called two-step phenol-formaldehyde resins, are generally fusible, brittle and grindable.

The resole type resins are usually prepared by reacting a mixture containing more than one mole of formaldehyde per each mole of phenol in the presence of an alkaline catalyst. The resole resins, also called one-step resins, can be either liquids, soft, low melting resins, or hard, brittle, grindable resins.

For a detailed discussion of phenol-formaldehyde resins and methods for the production thereof, reference is made to the books, Phenoplasts, by T. S. Carswell, Interscience Publishers (1947), and Chemie der Phenolharze, by K. Hultzsoh, Springer Verlag (1950) which are herein incorporated by reference.

The phenol-formaldehyde condensates are combined with the polyglycidyl ethers of the polyphenylols in stoichiometric amounts, that is, so that there is provided one reactive phenolic hydroxyl group per each epoxy group.

The compositions of this invention are conveniently prepared by admixing the phenol-formaldehyde condensates and the polyglycidyl ethers of the polyphenylols in suitable proportions of a common solvent. It is also convenient to form solutions, in miscible solvents, of both the polyglycidyl ether derivatives and the phenol-formaldehyde condensates and to blend the solutions. The aforementioned methods of combining the phenol-formaldehyde condensates and the polyglycidyl ethers are preferred as the high viscosity of the polyglycidyl compounds makes it rather difficult to adequately blend these compounds directly without recourse to blending and homogenizing apparatus.

The resultant solutions usually have a solids content from about 40 to 60 percent by weight and are quite stable at room temperature, increasing only slightly in viscosity during a period up to 60 days.

The actual solvent used to blend the phenol-formaldehyde condensates with the polyglycidyl ethers of the polyphenylols is not critical as long as the solvent dissolves both compounds and is inert and non-deleterious with respect thereto. Among solvents which have been found suitable are the organic esters, such as ethyl acetate, propyl acetate, butyl acetate, ethyl butyrate, and the like; ketones, such as ethyl methyl ketone, diethyl ketone; mixtures of alcohols, such as ethanol, propanol, butanol, with the aromatic hydrocarbons, such as toluene and benzene; the nitroalkanes, such as nitromethane, nitroethane, nitropropane, and the like may also be used, as well as Cellosolve, benzyl Cellosolve, and butyl Cellosolve, and other such alkoxy ethers.

The hardening or curing of the compositions of this invention is effected by heating the compositions at elevated temperatures whereby the phenol-formaldehyde condensates and the polyglycidyl ether derivatives react through the phenolic hydroxy groups and epoxy groups respectively to produce a hard, infusible product. The actual heating time and temperature will depend upon the formulation of the composition.

The hardening or curing reaction involving the phenol-formaldehyde condensate and the polyglycidyl ether derivative, although capable of being effected by heat alone, is generally promoted by the use of a catalyst. Catalysts which have been found particularly advantageous are the primary, secondary, and tertiary amines, alkali hydroxides, alkali phenoxide, Friedel-Crafts reagents, alkali metal salts of carboxylic acids, and quaternary ammonium compounds. Suitable catalysts for purposes of promoting the curing reaction of epoxides are enumerated in U.S. 2,935,488 to Phillips et al., which is incorporated herein by reference.

Generally, catalysts are used when desired in amounts sufficient to promote the hardening or curing reaction between the phenol-formaldehyde condensates and the polyglycidyl ether derivatives. The actual amount ranges from about 0.1 to about 4.0 percent by weight based on the weight of the polyglycidyl ether present in the composition. Additions of more than about 4 percent by weight degrade the thermal stability of the resultant composition.

As previously stated, the phenol-formaldehyde condensates and the polyglycidyl ethers of the polyphenylols can be blended in a common solvent to form a solution. The solution can be used as such to impregnate fabric or asbestos sheets which are to be stacked together and laminated. A small amount of catalyst is generally used in such cases to promote the hardening or curing reaction of the phenol-formaldehyde condensate with the polyglycidyl ether. Upon heating, the solvent is driven off. On applying pressure and more heat, the composition cures, bonding together the sheets in a unitary mass.

If desired, pigments and the like can be added to the compositions of the present invention.

To further illustrate this invention, a polyglycidyl ether of a polyphenylol which is hereafter referred to as polyglycidyl "A" was prepared and combined with phenol-formaldehyde condensates and the resultant composition was then used as the adhesive in the production of glass cloth laminates as shown in the examples which follow.

PREPARATION OF POLYGLYCIDYL "A"

To 2820 grams (30 moles) phenol containing 1.8 cc. concentrated HCl (37%) there were added dropwise 168 grams (3 moles) acrolein at 40° C.–45° C. The reaction was exothermic and cooling was required. It required one hour for all the acrolein to be added to the phenol. After the exothermic reaction ceased, heating was continued for one hour at 100° C. Unreacted phenol was then distilled off under reduced pressure (10–12 mm. Hg) to a temperature of 200° C. (thermometer bulb in the residue). The reddish colored residue was a liquid at 100° C. and solidified to a fusible, brittle solid at room temperature. The yield was 865 grams or 90 percent theoretical based on a calculated molecular weight of 320 for a triphenylol derivative. Analysis of the product gave the following results: molecular weight 360; OH, 15.1%; soluble in acetone and in ethyl alcohol and only slightly soluble in benzene. The determined molecular weight indicates that a major proportion of the reaction product consisted of triphenylols.

Eight hundred grams of the triphenylol product (7.5 equivalent OH groups) were dissolved in 525 grams ethyl alcohol and mixed with 2060 grams (22.5 moles) epichlorohydrin in a flask equipped with agitator and reflux condenser. Seven hundred three grams of a 50% aqueous solution of sodium hydroxide were added at the following rates, maintaining a temperature of 60° C.–61° C.: 10% during the first hour; 10% during the next half hour; and 70% in the next hour. The temperature was then reduced to 50° C.–55° C. and the remaining 10% added during one hour. The reaction mixture was heated an additional 15 minutes at 55° C., then distilled under subatmospheric pressure (50–75 mm. Hg) to a residue temperature (thermometer bulb in residue) of 65° C. The residue remaining in the flask was dissolved in 2500 cc. toluene and transferred to a separatory funnel where it was washed four times with water or until the wash water was no longer alkaline to litmus. The washed toluene solution of the residue was distilled under reduced pressure (50 mm. Hg) to a residue temperature of 110° C. The residual yield was 1180 grams, this being 96.8% theory based on resin. The residue was light amber in color, with a viscosity of 500,000 centipoises at 25° C. By analysis it had an epoxy content of 180 grams/gram mole epoxy ether or an epoxy equivalency or epoxide functionality of 3.0. Chloride content was 0.3%.

*Example 1*

A composition having an $f(t)$ of 4 was prepared as follows. One hundred eighty-two grams (0.33 mole) of polyglycidyl "A" were dissolved in 104 grams of toluene and added to a glass flask containing a solution of 107 grams (0.17 mole) of a phenol-formaldehyde novolak resin dissolved in 107 grams of ethyl alcohol. The mixture was thoroughly stirred and to the resultant solution was added 0.4 gram of alpha-methyl benzyl-dimethyl amine, a catalyst, dissolved in 75 grams of a 50–50 mixture in parts by weight of toluene and ethyl alcohol.

A strip of 181 weave glass cloth 78" by 6" was passed through this solution and thoroughly impregnated. The excess solution was wiped off by passing the strip through conventional doctor blades. The resin content of the strip was 30.8% by weight. The strip was cut into 12 pieces, 8" in length, 6" in width, and the 12 pieces were stacked and pressed at 160° C.–165° C. for 30 minutes at increasing pressures of 300–1000 p.s.i. The ⅛" thick laminate was post cured 6 hours at 400° F.

The laminate was subjected to prolonged exposure at high temperatures in order to determine its thermal stability with respect to its physical strengths and also to determine any weight loss which would be indicative of a degradation of the bonding composition. The tests and values obtained therefrom are shown below.

Flexural strength (ASTM–D–790):
77° F. _____p.s.i__ 61,800
400° F. _____p.s.i__ 27,600
Aged 200 hours at 500° F., tested at
500° F. _____p.s.i__ 22,400
Flexural modulus (p.s.i.) (ASTM–D–790):
77° F. _____ $2.75 \times 10^6$
400° F. _____ $2.18 \times 10^6$
500° F. _____ $2.22 \times 10^6$ Exposure to 500° F.: Percent weight loss
50 hours _____ 0.8
100 hours _____ 1.3
164 hours _____ 1.8
200 hours _____ 2.3

The phenol-formaldehyde novolak resin used in Example 1 was prepared as follows. Parts are parts by weight.

One hundred parts phenol and 72 parts of a 37% formaldehyde were admixed and pH of the resultant mixture adjusted to 1 by the addition of oxalic acid. The reaction mixture was heated and refluxed at a temperature of 103° C. at atmospheric pressure until no free formaldehyde remained. The mixture was then dehydrated to a residue temperature of 150° C. at atmospheric pressure. The resin was discharged into pans and cooled. It was a brittle, fusible, amber colored solid having an average molecular weight of about 640–650 and a hydroxyl functionality of 6.

To further indicate the surprisingly high thermal stability of the compositions of this invention, a composition was prepared as described in Example 1 with the exception that 194 grams (0.5 mole) of diglycidyl ether of 2,2-bis(p-hydroxyphenyl)propane having an epoxy equivalency of about 194 and an epoxy functionality of about 2 was combined with 107 grams (0.17 mole) of the phenol-formaldehyde condensate of Example 1.

A solution of this composition was used to impregnate sheets which were then laminated together also as described in Example 1. The laminate in this case was subject to a post cure in an oven at 300° F. for 6 hours. The flexural strength of the laminate is indicated below.

Flexural strength (ASTM–D–790): P.s.i.
77° F. _____ 75,000
160° F. _____ 58,000
200° F. _____ 52,000
260° F. _____ 16,000
Heat aged for 200 hours at 500° F. and tested at
200° F. _____ 14,500
Heat aged for 200 hours at 500° F. and tested at
500° F. _____ (1)
¹ Delaminated.

The above results clearly show that upon heat aging the composition having a functionality $f(t)$ of less than 3, i.e. 2, is thermally unstable. Heat aging at 500° F. for 200 hours and then testing the laminate for its flexural strength at 500° F. was impossible for the bonding composition decomposed and the laminate came apart.

Two additional compositions were also prepared, composition "B" and composition "C," and used in the preparation of glass cloth laminates. Compositions "B" and "C" were prepared as described in Example 1 of this specification with the following exceptions: Composition "B" instead of a phenol-formaldehyde condensate, a triphenylol product of phenol and acrolein, whose composition and method of preparation have been previously described, was combined with the polyglycidyl ether of the polyphenylol, polyglycidyl "A"; composition "C" comprised solely polyglycidyl "A" and methylene dianiline as the hardener. Compositions "B" and "C" were used in the preparation of glass cloth laminates also as described in Example 1. Laminates thus prepared were tested for flexural strength and the data obtained tabulated below.

Flexural strength (ASTM–D–790); P.s.i.
Composition "B":
77° F. _____ 76,200
400° F. _____ 20,400
Aged for 100 hrs. at 500° F. and tested at
500° F. _____ 13,900
Composition "C":
77° F. _____ 71,000
Aged for 100 hours at 500° F. and tested at
500° F. _____ 2,200

Results of the above table clearly show the degradation of physical properties of laminates wherein the bonding composition does not contain a phenol-formaldehyde condensate.

*Example 2*

A composition having an $f(t)$ of 3 was prepared by dissolving 181.4 grams (0.33 mole) of polyglycidyl "A" in 100 grams of toluene and mixing this solution with a solution of 102 grams (0.33 mole) of a phenol-formaldehyde novolak resin in 106 grams of ethyl alcohol. The novolak had a phenolic hydroxyl functionality of 3 and an average molecular weight of about 306.

The mixture was thoroughly stirred and to the mixture was then added a solution of 0.6 gram of alpha methyl benzyl dimethylamine in 75 grams of a 50–50 mixture in parts by weight of toluene and ethyl alcohol.

A laminate was then prepared in a manner described in Example 1 using the above composition with the exception that the resin content of the strip of glass cloth was 33.1% by weight. The flexural strength of the laminate at various temperatures is noted below.

Flexural strength (ASTM-D-790): P.s.i.
77° F. — 69,000
400° F. — 21,000
500° F. — 16,000
Aged 200 hours at 500° F. and tested at 500° F. — 21,500

*Example 3*

A composition having an $f(t)$ of 3.4 was prepared by dissolving 181.4 grams (0.33 mole) of polyglycidyl "A" in 100 grams of toluene and mixing this solution with a solution of 105 grams (0.25 mole) of a phenol-formaldehyde novolak resin in 80 grams of ethyl alcohol. The novolak had a phenolic hydroxyl functionality of 4 and an average molecular weight of about 420.

The mixture was thoroughly stirred and to this mixture there was then added a solution of 0.6 gram of alpha methyl benzyl dimethylamine in 75 grams of a 50-50 mixture, in parts by weight, of toluene and ethyl alcohol.

A laminate was prepared in a manner as described in Example 1 using the above composition with the exception that the resin content of the strip of glass cloth was 32.2% by weight.

The flexural strength of the laminate at various temperatures is noted below.

Flexural strength (ASTM-D-790): P.s.i.
77° F. — 64,000
400° F. — 23,000
500° F. — 17,500
Aged 200 hours at 500° F. and tested at 500° F. — 22,400

*Example 4*

A composition having an $f(t)$ of 3.75 was prepared by dissolving 181.4 grams (0.33 mole) of polyglycidyl "A" in 100 grams of toluene and mixing this solution with a solution of 106 grams (0.20 mole) of a phenol-formaldehyde novolak resin in 84 grams of ethyl alcohol. The novolak had a phenolic hydroxyl functionality of 5 and an average molecular weight of about 530.

The mixture was thoroughly stirred and to the mixture there was then added 0.6 gram of alpha methyl benzyl dimethylamine dissolved in a solution of 75 grams of a 50-50 mixture, in parts by weight, of toluene and ethyl alcohol.

A laminate was prepared in a manner described in Example 1 using the above composition with the exception that the resin content of the strip of glass cloth was 33.4% by weight.

The flexural strength of the laminate at various temperatures is noted below.

Flexural strength (ASTM-D-790): P.s.i.
77° F. — 61,000
400° F. — 23,000
500° F. — 18,700
Aged 200 hours at 500° F. and tested at 500° F. — 22,800

*Example 5*

A composition having an $f(t)$ of 4.75 was prepared by dissolving 175 grams of tetraglycidyl ether of 1,1,5,5-tetrakis-(hydroxyphenyl)pentane in 167 grams of toluene and mixing this solution with a solution of 107 grams of the novolak described in Example 1 in 107 grams of ethyl alcohol. The mixture was thoroughly stirred and to the mixture there was then added a solution of 0.6 gram of alpha methyl benzyl dimethylamine dissolved in 75 grams of a 50-50 mixture, in parts by weight, of toluene and ethyl alcohol.

A laminate was prepared in a manner described in Example 1 using the above composition with the exception that the resin content of the strip of glass cloth was 34.7% by weight. The flexural strength of the laminate at various temperatures is noted below.

Flexural strength (ASTM-D-790): P.s.i.
77° F. — 78,300
400° F. — 26,600
500° F. — 17,200
Aged for 200 hours at 500° F. and tested at 500° F. — 26,600

What is claimed is:

1. A heat-hardenable composition having a functionality of at least 3 comprising a polyglycidyl ether of a polyphenylol having from three to four phenylol groups inclusive which are connected through a common aliphatic, hydrocarbon group, and having a functionality of from three to four inclusive, and a reactive phenol-formaldehyde condensate having an average phenolic hydroxyl functionality of at least three, said materials being present in stoichiometric amounts.

2. A heat-hardenable composition as defined in claim 1 wherein the polyglycidyl ether is the triglycidyl ether of 1,1,3-tris(hydroxyphenyl)propane.

3. A heat-hardenable composition as defined in claim 1 wherein the polyglycidyl ether is the tetraglycidyl ether of 1,1,5,5-tetrakis(hydroxyphenyl)pentane.

4. A heat-hardenable composition as defined in claim 1 wherein the phenol-formaldehyde condensate is a phenol-formaldehyde novolak resin.

5. A heat-hardenable composition having a functionality of at least 3 comprising a polyglycidyl ether of a polyphenylol having from three to four phenylol groups inclusive which are connected through a common aliphatic, hydrocarbon group and having a functionality of from three to four inclusive, a reactive phenol-formaldehyde condensate having an average phenolic hydroxyl functionality of at least three, and a catalytic amount of a catalyst for promoting the hardening reaction between the said polyglycidyl ether and phenol-formaldehyde condensate, said polyglycidyl ether and phenol-formaldehyde condensate being present in stoichiometric amounts.

6. A heat-hardenable composition as defined in claim 5 wherein the polyglycidyl ether is the triglycidyl ether of 1,1,3-tris(hydroxyphenyl)propane.

7. A heat-hardenable composition as defined in claim 5 wherein the polyglycidyl ether is the tetraglycidyl ether of 1,1,5,5-tetrakis(hydroxyphenyl)pentane.

8. A heat-hardenable composition as defined in claim 5 wherein the phenol-formaldehyde condensate is a phenol-formaldehyde novolak resin.

9. A heat-hardenable composition as defined in claim 5 wherein the catalyst is alpha methyl benzyl dimethylamine.

10. The hardened product of the composition defined in claim 1.

11. The hardened product of the composition defined in claim 2.

12. The hardened product of the composition defined in claim 3.

13. The hardened product of the composition defined in claim 4.

14. The hardened product of the composition defined in claim 5.

15. The hardened product of the composition defined in claim 6.

16. The hardened product of the composition defined in claim 7.

17. The hardened product of the composition defined in claim 8.

18. The hardened product of the composition defined in claim 9.

19. A laminate comprising laminate layers bonded together by the hardened product of the composition defined in claim 1.

(References on following page)

References Cited by the Examiner

UNITED STATES PATENTS

| | | | |
|---|---|---|---|
| 2,521,911 | 9/1950 | Greenlee | 260—42 |
| 2,801,989 | 8/1957 | Farnham | 260—47 |
| 2,806,016 | 9/1957 | Schwarzer | 260—43 |
| 2,857,362 | 10/1958 | Shepherd et al. | 260—42 |
| 2,885,385 | 5/1959 | Farnham | 260—47 |
| 3,028,251 | 4/1962 | Nagel | 260—43 |

MURRAY TILLMAN, *Primary Examiner.*

DANIEL ARNOLD, LEON J. BERCOVITZ, *Examiners.*